United States Patent
Fukunaga

[11] Patent Number: 6,009,764
[45] Date of Patent: Jan. 4, 2000

[54] FREQUENCY DISCRIMINATION TYPE TORQUE TESTER FOR USE IN DETERMINING BEARING QUALITY

[75] Inventor: Mitsuru Fukunaga, Miyota-machi, Japan

[73] Assignee: Minebea Co., Ltd., Kitasaku, Japan

[21] Appl. No.: 09/069,952

[22] Filed: Apr. 30, 1998

[30] Foreign Application Priority Data

May 8, 1997 [JP] Japan .................................. 9-117804

[51] Int. Cl.⁷ ........................................................ G01L 3/02
[52] U.S. Cl. .............................. 73/862.193; 73/892.08; 384/448
[58] Field of Search .......................... 73/862.08, 862.193, 73/862.322, 862.49; 384/448

[56] References Cited

U.S. PATENT DOCUMENTS

| | | |
|---|---|---|
| 3,201,981 | 8/1965 | Barnard . |
| 4,680,976 | 7/1987 | Lustenberger ............... 73/862.331 |
| 4,763,508 | 8/1988 | Buck . |
| 4,884,449 | 12/1989 | Nishimoto et al. .............. 73/660 |
| 5,263,372 | 11/1993 | Matsuzaki et al. .............. 73/593 |
| 5,311,763 | 5/1994 | Gibbs, Jr. et al. . |
| 5,517,858 | 5/1996 | Matsuzaki et al. .............. 73/593 |

*Primary Examiner*—Max Noori
*Attorney, Agent, or Firm*—Staas & Halsey, L.L.P.

[57] ABSTRACT

A frequency discrimination type torque tester which breaks down a torque acting between outer and inner races of a bearing into a spiky change component and an undulated change component. Output from a load cell is classified by frequency bands and the quality of the bearing can be evaluated by dividing the output into a torque chart recording only undulated changes based on deviation from roundness or rotational deflection, and which are gentle with the lapse of time, and a torque chart recording only spiky changes based on finishing accuracy of the race surface of the bearing or on a dent or dust included in the bearing, and which are of short duration.

6 Claims, 8 Drawing Sheets

FREQUENCY DISCRIMINATION TYPE TORQUE TESTER FOR USE IN DETERMINING BEARING QUALITY

BACKGROUND OF THE INVENTION

1. Field of the Invention

The present invention relates to a frequency discrimination type torque tester for use in determining the quality of a bearing and more particularly to a frequency discrimination type torque tester having the function of judging a main cause of variation in torque which has been measured.

2. Description of the Prior Art

Heretofore, the measurement of torque has been conducted as one means for evaluating the quality of a bearing. According to this known means, while an outer race and an inner race of a bearing are rotated relative to each other, a rotational torque transmitted from one race to the other is detected as a load by means of a load cell, then the values measured in this way are expressed in terms of a chart wherein the measured values are arranged in time series, and the quality of the bearing is evaluated using maximum, minimum and mean values of the measured values on the chart.

Figure 6:
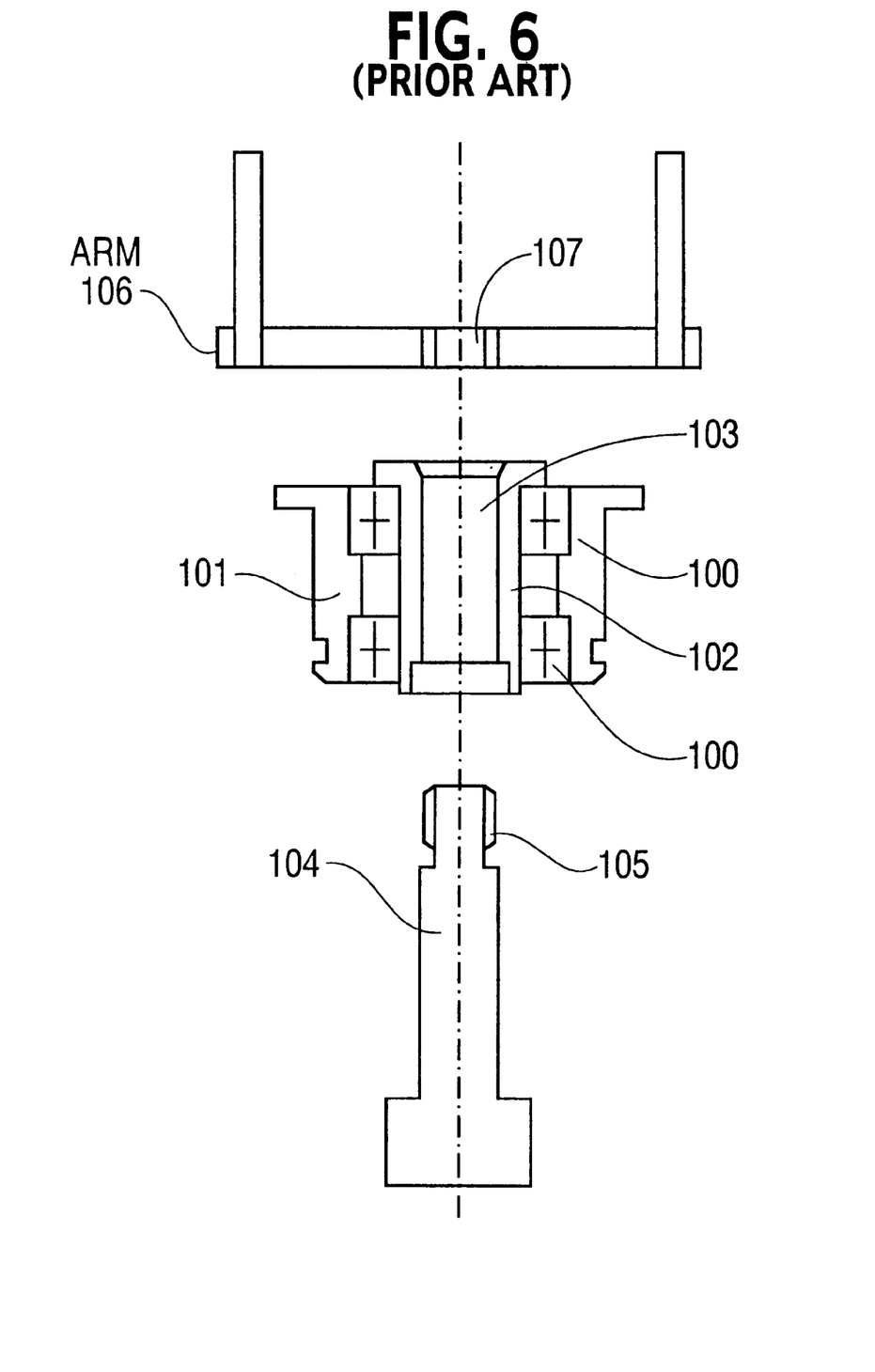
FIG. 6 is an exploded view of a portion of a conventional evaluating means of prior art.
Figure 7:
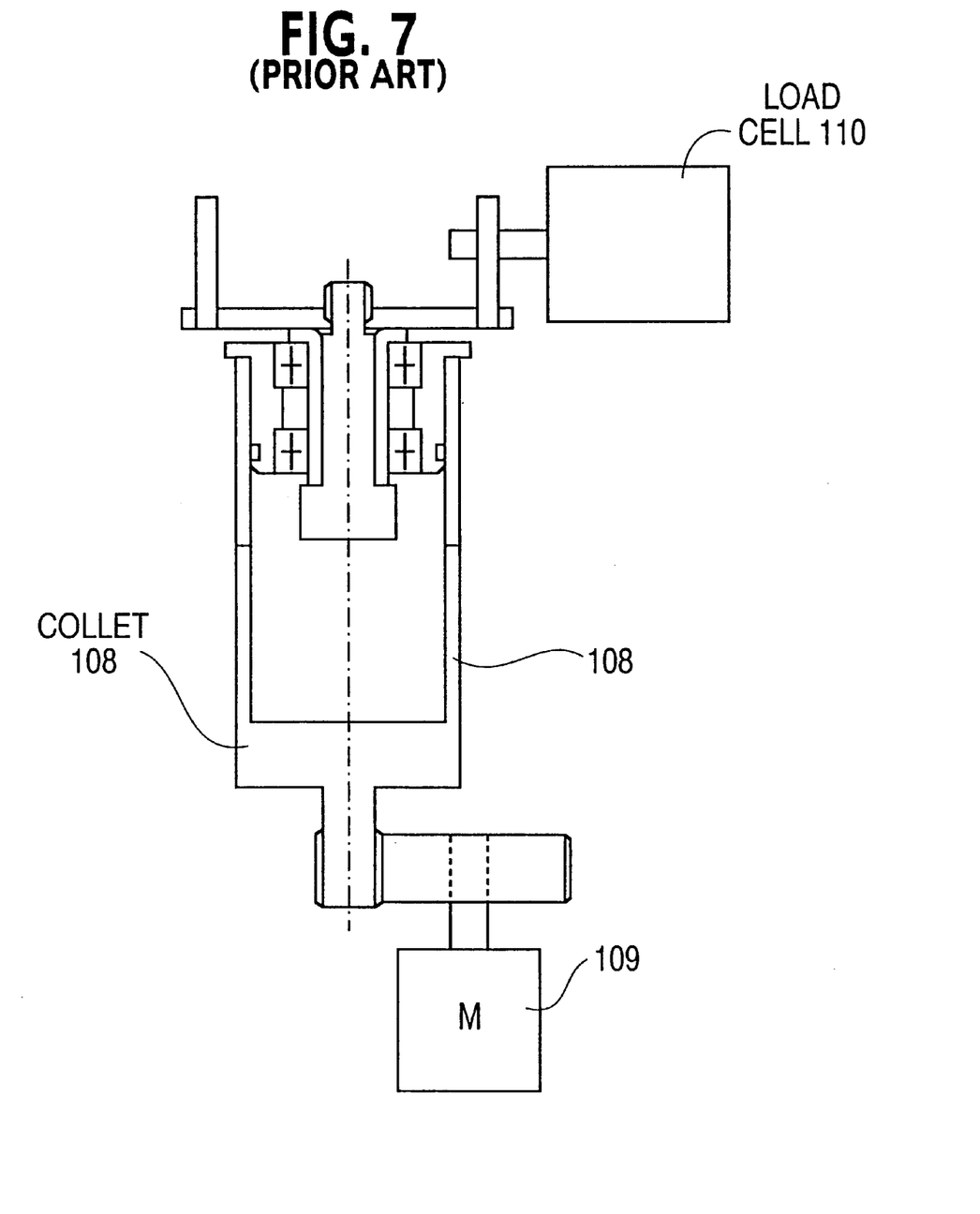
FIG. 7 is a sectional view showing a state in which the bearing is set and a rotational torque is measured by a load cell.

The details of the above bearing quality evaluating means will now be described. FIG. 6 is an exploded view of a portion of the conventional evaluating means in which bearings as test samples are set to the same means. FIG. 7 is a sectional view showing a state in which the bearing is set and a rotational torque is measured by a load cell. As shown in FIG. 6, outer races of bearings 100 and 100 as test samples are fitted and held inside a cylindrical holding case 101 to constitute fulcrum bearings, while a threaded fitting cylinder 102 matching the inside diameter of the said fulcrum bearing is fitted in inner races of the bearings 100 and 100. A mounting screw 104 is inserted into a central bore 103 of the threaded fitting cylinder 102, and a threaded portion 105 thereof is brought into threaded engagement with a tapped hole 107 formed in the center of a fulcrum arm 106, whereby the fulcrum arm is mounted to the fulcrum bearing.

Figure 8:
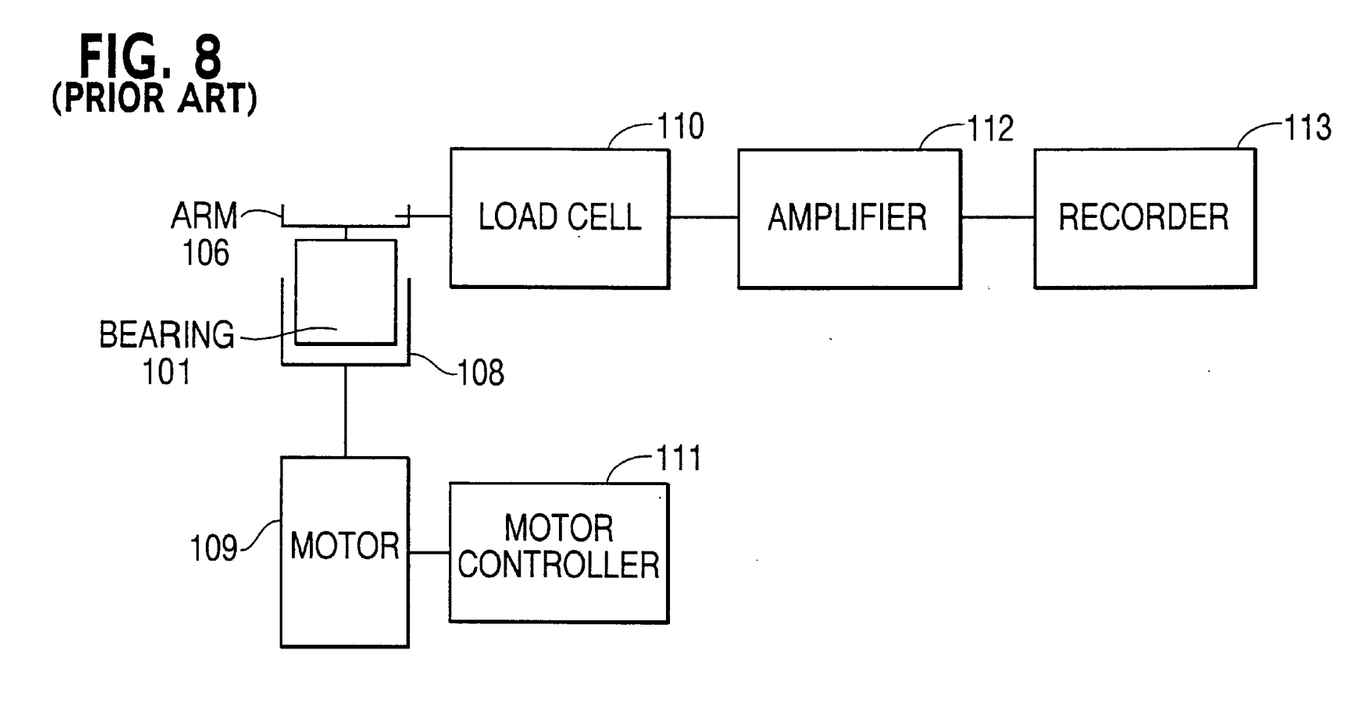
FIG. 8 is a block diagram of prior art.

A collet 108 matching the outside diameter of the fulcrum bearing thus assembled is fitted on the fulcrum bearing with the fulcrum arm 106 attached thereto (see FIG. 7) and is connected to a rotary part of a motor 109. In this state the motor 109 is rotated and a load transmitted from the fulcrum arm 106 to a load cell 110 is measured, as shown in FIG. 7, which measured value is used as the torque of the inner race of the fulcrum bearing. As shown in a block diagram of FIG. 8, a torque tester for evaluating the quality of the bearings on the basis of the torque thus measured mainly comprises a motor controller 111 for controlling the rotation of the motor 109, an amplifier 112 for amplifying a torque signal which is outputted from the load cell 110, and a recorder 113 for recording the torque signal to evaluate the fulcrum bearing.

Figure 9:
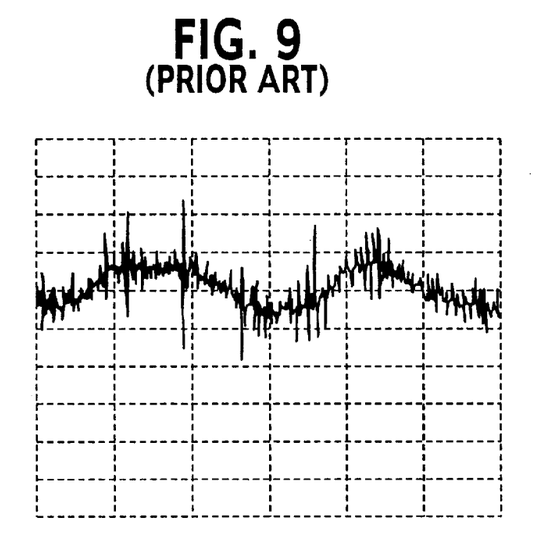
FIG. 9 is a characteristic chart of measured torque of prior art.
Figure 10:
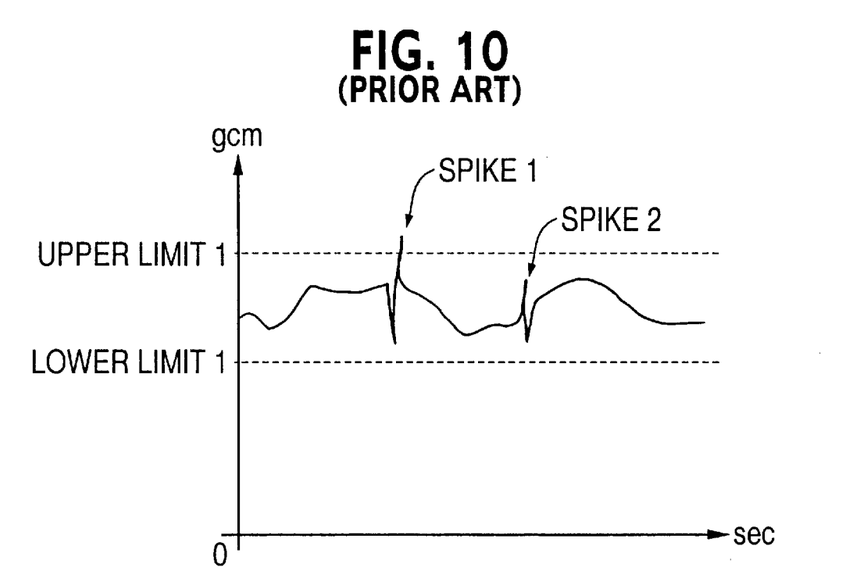
FIG. 10 is another characteristic chart of measured torque of prior art.

In the system thus constructed, if the fulcrum bearing is an ideal fulcrum bearing completely free of friction between the outer race and balls and also completely free of friction between the balls and the inner race, the torque of the inner race will be zero even if the outer race is rotated. Actually, however, there occurs such friction, so the load cell 110 detects the load and the torque tester outputs the detected torque value to the recorder 113 in accordance with the rotational speed of the outer race. FIG. 9 shows an example of outputs from the torque tester to the recorder in the prior art. FIG. 10 is a schematic diagram for explaining the phenomenon shown in FIG. 9. As shown in FIG. 10, time-series changes in torque value are classified into undulated changes and spiky changes according to, for example, deviation from roundness, rotational deflection, and finishing accuracy of the race surfaces of the bearing. Changes based on deviation from roundness and rotational deflection are gentle undulated changes observed with the lapse of time. On the other hand, changes based on finishing accuracy of the race surfaces of the bearing or a dent or dust which has got into the bearing are short spiky changes observed with the lapse of time. As a matter of course, it is preferable from the standpoint of quality that the degree of such changes be as small as possible.

According to the above conventional torque tester, maximum value, minimum value, maximum value minus minimum value, and mean value, are obtained on the torque chart recorded in the recorder 113 and the quality of the bearing as a test sample is evaluated on the basis of the values thus obtained. To be more specific, in the conventional method, as shown in FIG. 10, an upper limit value 1 and a lower limit value 1 are set for each data, and if the measured torque exceeds these limit values, the test sample concerned is regarded as being defective. According to this method, however, although a test sample containing such a component as spike 1 in FIG. 10 can be judged to be defective, a test sample containing a spiky component not exceeding the limit values such as spike 2 cannot clearly be judged to be defective from the torque chart in question despite it being defective.

SUMMARY OF THE INVENTION

The present invention has been accomplished to eliminate the above-mentioned inconvenience of the prior art and it is an object of the invention to provide a frequency discrimination type torque tester which breaks down changes in torque between outer and inner races of a bearing into a spiky change component and an undulated change component to make a more accurate evaluation of the bearing.

According to the torque tester of the present invention, in order to achieve the above-mentioned object, outputs from a load cell are discriminated by frequency bands into a torque chart recording only undulated changes based on deviation from roundness or rotational deflection and which are gentle with the lapse of time and a torque chart recording only spiky changes based on finishing accuracy of the race surfaces of the bearing or a dent or dust included in the bearing and which are short in terms of time.

More specifically, according to the present invention, there is provided a frequency discrimination type torque tester by rotating an outer race and an inner race of a ball bearing relative to each other and evaluating the quality of the ball bearing according to the degree of transfer of a torque applied to one race to the other, the torque tester comprising a drive source for applying a torque to either the outer race or the inner race of the ball bearing as a test sample and thereby rotating the race, a torque sensor for detecting a torque induced on the other race to which the torque applied to one race is transmitted, filters for dividing the frequency band of an output of the said torque sensor into a plurality of desired bands, and evaluating means for evaluating the quality of the ball bearing from torque sensor outputs in the thus-divided frequency bands. The torque tester is also characterized in that the said torque sensor is a load cell. Further, the frequency component of the torque sensor output is divided into two by means of a high-pass filter for separating a spiky change component which is based on finishing accuracy of the race surfaces of the ball bearing or a dent or dust included in the bearing and which is short in terms of time and a low-pass filter for separating a gentle undulated change component based on deviation from roundness of the race surfaces of the ball bearing or rotational deflection, and the quality of the ball bearing is evaluated in accordance with output signals provided from both filters. It is a further feature of the present invention that the whole frequency component region of the torque sensor output is divided with use of a high-pass filter, a band-pass filter and a low-pass filter for evaluating the quality of the ball bearing from torque sensor outputs having passed through the plural filters each separating only a frequency region which represents a desired characteristic of the ball bearing from the whole frequency component region, without making limitation to such bisection by both low-and high-pass filters as mentioned above.

According to a still further feature of the present invention, the torque tester is provided with a data processor for obtaining maximum and minimum values of measured torque values, the difference between the two, and a mean value and then comparing those values with preset values, the data processor having means for detecting that the measured torque values have exceeded threshold values set for the measured torque values and then judging this test sample to be defective.

DESCRIPTION OF THE PREFERRED EMBODIMENTS

Figure 1:
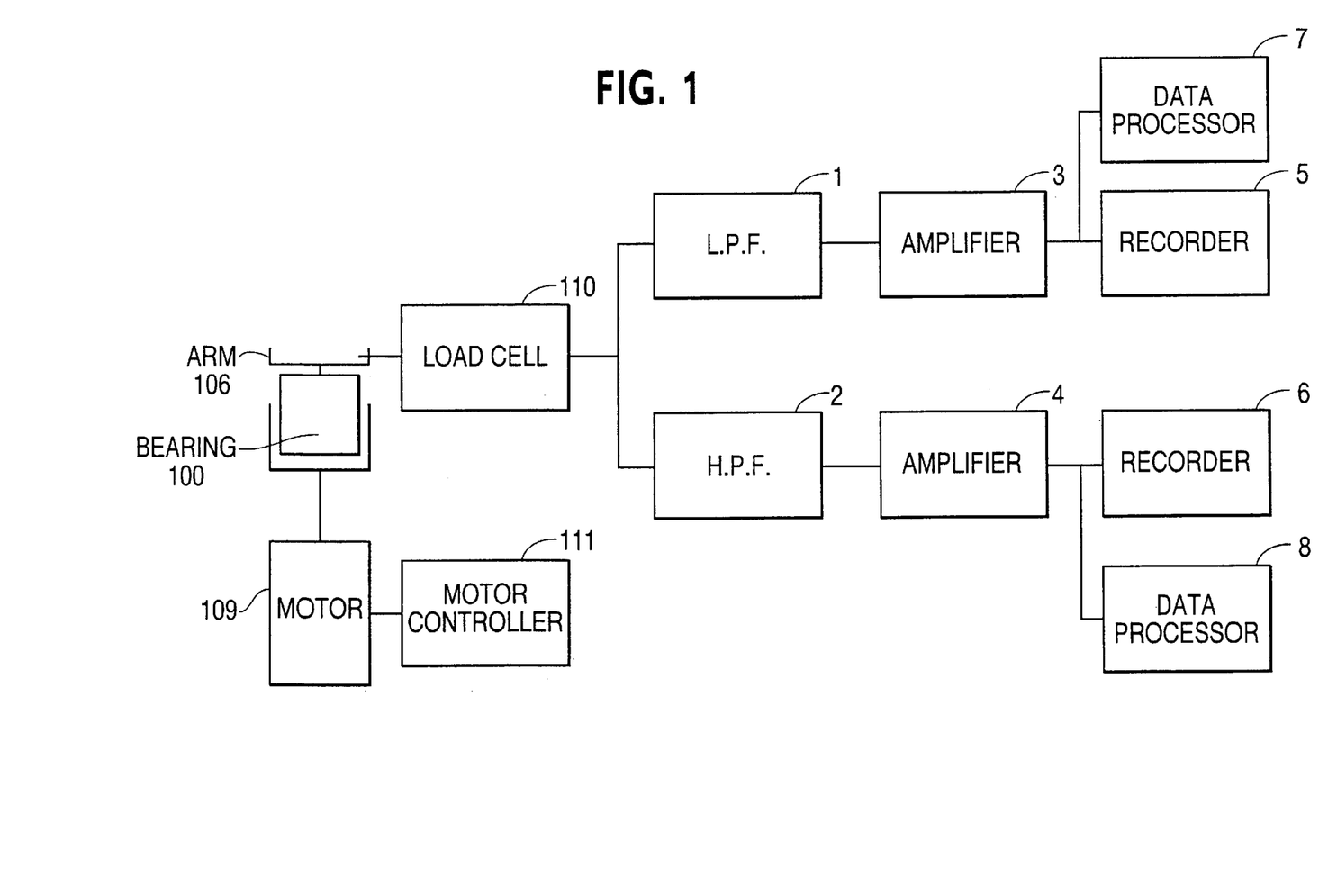
FIG. 1 is block diagram of an embodiment of this invention.

An embodiment of the present invention will now be described in detail with reference to the accompanying drawings. FIG. 1 is a block diagram showing a frequency discrimination type torque tester according to an embodiment of the present invention. In this torque tester, as shown in FIG. 1, a low-pass filter (hereinafter referred to simply as "LPF") 1 and a high-pass filter ("HPF" hereinafter) are connected in parallel with an output terminal of a load cell 110 to separate a torque output into low and high frequency components, which are then amplified respectively by amplifiers 3 and 4, and output signals from the amplifiers are recorded respectively in recorders 5 and 6, or outputs of the recorders 5 and 6 are displayed on a display unit (not shown). The operator evaluates the bearing after reading out the data recorded in the recorder or while looking at waveforms displayed on the display unit. In FIG. 1, the same portions as in the prior art are indicated by like reference numerals and explanations thereof will be omitted.

Figure 2:
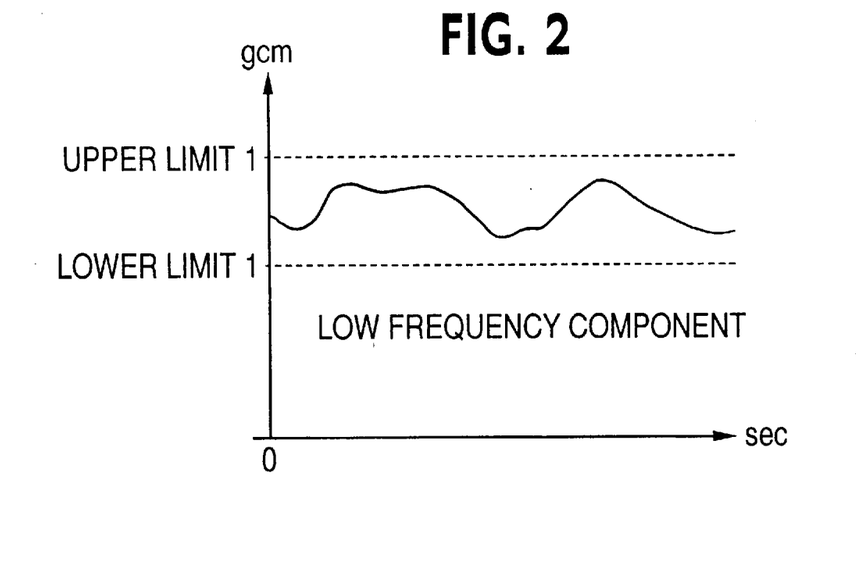
FIG. 2 is a low frequency characteristic chart of this invention.

For obtaining maximum and minimum values of torque output values, as well as maximum value minus minimum value, and mean value, there are used data processors 7 and 8 having a numerical data processing function. The data processors 7 and 8 receive outputs from the amplifiers 3 and 4, respectively, and process them, then cause the result of good-bad judgment on the test sample to be recorded or displayed automatically on the basis of comparison with preset maximum value minus minimum value. By thus recording the output of the load cell 110 after frequency discrimination at appropriately selected cut-off frequencies of LPF1 and HPF2, as to the output of the conventional torque tester shown in FIG. 9, the output having passed through LPF1 is recorded with respect to only an undulated change which is caused by deviation from roundness or rotational deflection and which is gentle with the lapse of time, as shown in FIG. 2, and the output having passed through HPF2 is recorded with respect to a spiky change which is based on finishing accuracy of the race surfaces of the bearing concerned or a dent or dust included in the bearing and which is short in terms of time, as shown in FIG. 3.

Figure 3:
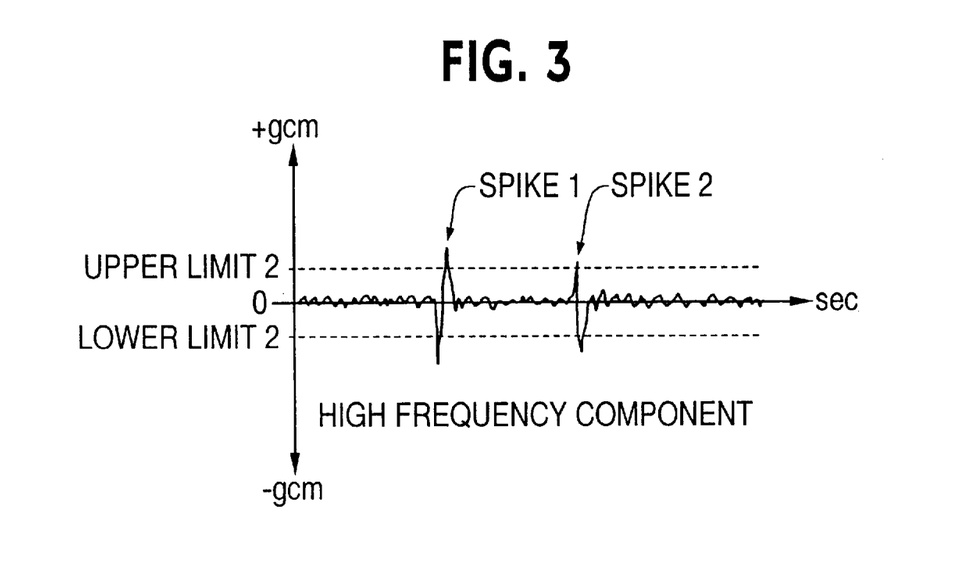
FIG. 3 is a high frequency characteristic chart of this invention.

Thus, not only is it possible to classify the factors of causing torque changes and make separate evaluations but also as to the spike 2 in FIG. 9, for which the conventional torque tester referred to previously is apt to make a wrong judgment, can be clearly judged to be defective in FIG. 3. In the embodiment illustrated in FIG. 1, the filters 1 and 2 are connected to the output terminal of the load cell 110, followed by amplification of the outputs from those filters. Alternatively, the output of the load cell 110 may first be amplified, followed by separation into required frequency components by the filters 1 and 2.

Although in the above embodiment the output of the load cell is separated into two frequency bands by both low-and high-pass filters, the high-pass filter may be substituted by a plurality of band-pass filters to make a further separation and record more detailed data as to whether spiky changes which are short in terms of time are based on finishing accuracy of the race surfaces of the bearing as a test sample or are ascribable to a dent or dust included in the bearing. Likewise, also as to the low-frequency band, it may be separated and recorded by means of plural band-pass filters as necessary.

Referring now to FIGS. 4 and 5, there are shown examples of measurement using fulcrum bearings as test samples. The example shown in FIG. 4 is of a fulcrum bearing which undergoes relatively small changes in torque, while the example shown in FIG. 5 is of a fulcrum bearing having race surfaces of a rough finishing accuracy. The rotational speed of the motor in the torque tester is set at 30 rpm, and 500 ms/DIV and 100 mv/DIV are plotted along the axis of abscissa and the axis of ordinate, respectively, in each torque chart, corresponding to 0.1 gcm/DIV in terms of torque.

Figure 4A:
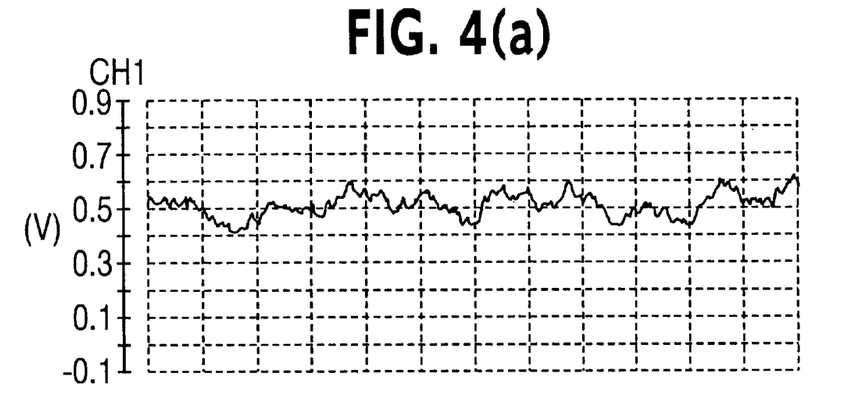
FIGS. 4a–c are a characteristic charts of measured torque of this invention.
Figure 4B:
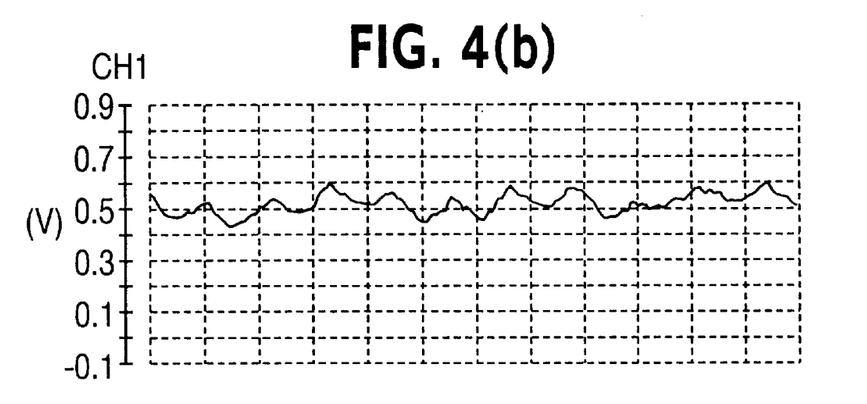
Figure 4C:
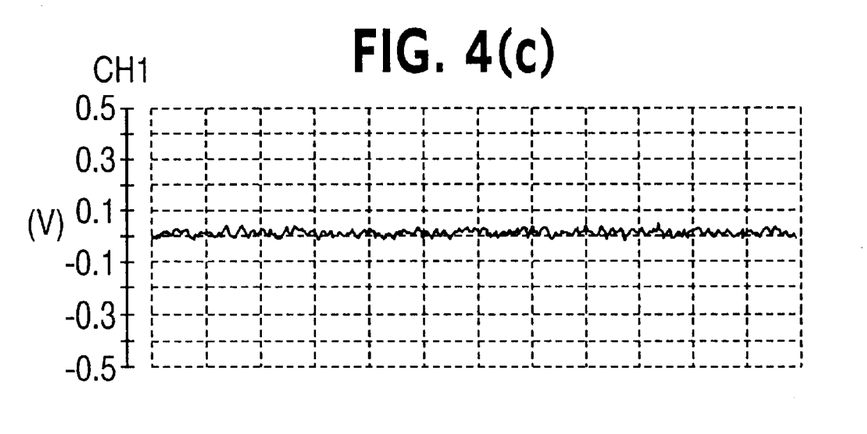
Figure 5A:
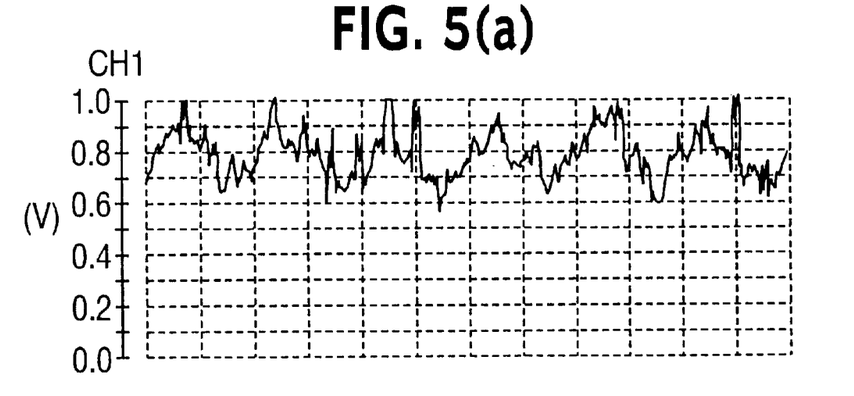
FIGS. 5a–c are other characteristic charts of measured torque of this invention
Figure 5B:
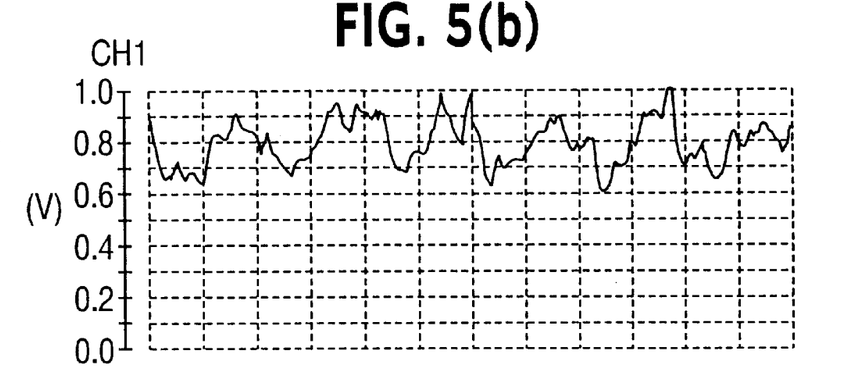
Figure 5C:
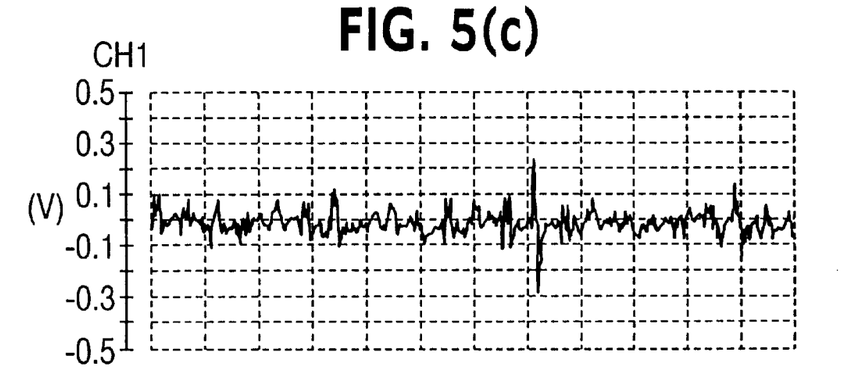

FIGS. 4(a) and 5(a) represent measured values obtained using the conventional torque tester, FIGS 4(b) and 5(b) represent data obtained by passing the output of the load cell through an LPF with a cut-off frequency of 5 HZ and subsequent amplification, and FIGS. 4(c) and 5(c) represent data obtained by passing the output of the load cell through an HPF with a cut-off frequency of 7.23 HZ and subsequent amplification. As is apparent from these figures, the measured data obtained by the torque tester of the present invention can be evaluated in a classified manner between torque changes based on deviation from roundness or rotation deflection and those based on finishing accuracy of the bearing race surfaces, etc. Thus, the torque tester of the present invention permits a more accurate evaluation on the quality of bearing than the conventional torque tester.

Although the present invention has been described above by way of an embodiment thereof, various modifications and applications may be made within the scope of its gist, which modifications and applications are not excluded from the scope of the invention.

As mentioned above, the frequency discrimination type torque tester of the present invention is for evaluating the quality of a ball bearing by rotating outer and inner races of the bearing relative to each other and judging the degree of transfer of a torque applied to one race to the other, and comprises a drive source for applying a torque to one of the outer and inner races of the ball bearing as a test sample and rotating it thereby, a torque sensor for detecting a torque induced on the other race to which the torque applied to one race is transferred, filters for separating the frequency band of the output of the torque sensor into a plurality of desired bands, and means for evaluating the quality of the ball bearing in accordance with torque sensor outputs from those filters in the thus-separated frequency bands. According to this construction, the quality of the bearing can be evaluated for each factor of causing a torque change from a torque chart obtained by measurement. Therefore, the analysis of a defect factor is easy and it is possible to make a more accurate evaluation on the quality of a bearing in comparison with conventional torque testers of this type.

What I claim is:

1. A frequency discrimination type torque tester by rotating an outer race and an inner race of a ball bearing relative to each other and evaluating the quality of the ball bearing according to the degree of transfer of a torque applied to one race to the other, comprising:

a drive source for applying a torque to either the outer race or the inner race of the ball bearing as a test sample and thereby rotating the race;

a torque sensor for detecting torque induced on the other race to which the torque applied to one race is transmitted;

filters for dividing the frequency band of an output of the said torque sensor into a plurality of desired bands wherein said filters include a high-pass filter for separating a spiky change component which is based on finishing accuracy of the race surfaces of the ball bearing or a dent or dust included in the bearing and which is short in terms of time, and generating an output signal of said component, and a low-pass filter for separating a gentle undulated change component based on deviation from roundness of the race surfaces of the ball bearing or rotational deflection, and generating an output signal of said component; and evaluating means for evaluating the quality of the ball bearing from said output signals provided from both filters.

2. The frequency discrimination type torque tester according to claim 1, wherein said torque sensor is a load cell.

3. The frequency discrimination type torque tester according to claim 1, wherein the data processor includes means for detecting that the measured torque values have exceeded threshold values set for the measured torque values, and then judging this test sample to be defective.

4. The frequency discrimination type torque tester according to claim 1, wherein the high and low filters are band pass filters for separating different frequency bands.

5. The frequency discrimination type torque tester according to claim 1, further comprising a middle frequency range-pass filter for separating a middle frequency component, and generating an output signal of said component.

6. The frequency discrimination type torque tester according to claim 1, wherein the torque tester is provided with a data processor for obtaining maximum and minimum values of measured torque values, the difference between the two, and a mean value, and then comparing those values with preset values.

* * * * *